United States Patent
Itaya et al.

(10) Patent No.: US 12,542,471 B2
(45) Date of Patent: Feb. 3, 2026

(54) INVERTER INTEGRATED MOTOR

(71) Applicant: Hitachi Astemo, Ltd., Hitachinaka (JP)

(72) Inventors: Takaki Itaya, Hitachinaka (JP);
Noriyuki Maekawa, Hitachinaka (JP);
Hideaki Goto, Hitachinaka (JP);
Shigehisa Aoyagi, Hitachinaka (JP);
Takashi Hirao, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 246 days.

(21) Appl. No.: 18/033,916

(22) PCT Filed: Sep. 9, 2021

(86) PCT No.: PCT/JP2021/033119
§ 371 (c)(1),
(2) Date: Apr. 26, 2023

(87) PCT Pub. No.: WO2022/097364
PCT Pub. Date: May 12, 2022

(65) Prior Publication Data
US 2023/0402904 A1     Dec. 14, 2023

(30) Foreign Application Priority Data
Nov. 4, 2020   (JP) ................................ 2020-184106

(51) Int. Cl.
*H02K 11/33*     (2016.01)
*H02K 9/197*     (2006.01)
*H02K 9/22*      (2006.01)

(52) U.S. Cl.
CPC ............. *H02K 11/33* (2016.01); *H02K 9/197* (2013.01); *H02K 9/225* (2021.01)

(58) Field of Classification Search
CPC ........ H02K 11/33; H02K 11/30; H02K 11/38; H02K 9/00; H02K 9/02; H02K 9/04;
(Continued)

(56) References Cited

U.S. PATENT DOCUMENTS 10,888,036 B1 *   1/2021   Joshi ................... H05K 1/0203
10,958,136 B2 *   3/2021   Yamaguchi ............ H02K 11/33
(Continued)

FOREIGN PATENT DOCUMENTS

JP    2011-182480 A    9/2011
JP    2018-007374 A    1/2018
(Continued)

OTHER PUBLICATIONS

English Translation of International Search Report for International Application No. PCT/JP2021/033119 dated Nov. 9, 2021 (2 pages).

Primary Examiner — Alexander A Singh
(74) Attorney, Agent, or Firm — Foley & Lardner LLP (57) ABSTRACT

An object of the present invention is to provide an inverter integrated motor that can effectively cool a power module of an inverter portion. An inverter portion 120 is connected to a motor portion and includes a power module 121 that converts a DC power into an AC power, a first flow path forming body 221a that is provided between a motor and the power module 121 and forms a first flow path 221, and a second flow path forming body 222a that is disposed on a side opposite a side of the first flow path forming body 221a (side of the motor 110) over the power module 121 and forms a second flow path 222. The first flow path forming body 221a and second flow path forming body 222a are formed so that a flow rate of a refrigerant F1 flowing in the first flow path forming body 221a is greater than a flow rate of a refrigerant F2 flowing in the second flow path forming body 222a.

9 Claims, 10 Drawing Sheets (58) Field of Classification Search
CPC .. H02K 9/06; H02K 9/08; H02K 9/10; H02K 9/12; H02K 9/14; H02K 9/16; H02K 9/18; H02K 9/19; H02K 9/193; H02K 9/197; H02K 9/22; H02M 7/003
USPC ..... 310/52, 53, 54, 55, 57, 58, 59, 60 R, 61, 310/60 A, 64, 68 R
See application file for complete search history.

(56) References Cited

U.S. PATENT DOCUMENTS

| | | |
|---|---|---|
| 2010/0013331 A1 | 1/2010 | Yoshida et al. |
| 2013/0049495 A1 | 2/2013 | Matsuo |
| 2015/0333602 A1 | 11/2015 | Mohr |
| 2021/0175771 A1* | 6/2021 | Tanabe ................ H02M 7/5387 |
| 2023/0188007 A1* | 6/2023 | Sano ..................... H02K 11/33 |
| | | 310/68 D |

FOREIGN PATENT DOCUMENTS

| | | |
|---|---|---|
| JP | 2019-126169 A | 7/2019 |
| JP | 2020-018094 A | 1/2020 |
| WO | WO-2008/059723 A1 | 5/2008 |

\* cited by examiner

INVERTER INTEGRATED MOTOR

TECHNICAL FIELD

The present invention relates to a motor to which an inverter is integrated.

BACKGROUND ART

A rotating electric machine unit disclosed in JP 2020-18094 A (PTL 1) is known as background technology of the present technical field. In PTL 1, the rotating electric machine unit includes a power module that is attached to an outer circumference surface of a housing of the unit. The housing includes an inner cooling part forming the inner circumference surface of the housing, the outer cooling part forming the outer circumference surface of the housing, and a housing flow path provided between the inner and outer cooling parts. With this structure, the power module is cooled by a refrigerant flowing in the housing flow path (see Abstract).

PTL 1 further discloses in Paragraph 0180 to 0117 that the power module includes a semiconductor device and a cooler, and the cooler cools inside the power module. The cooler includes a feeding pipe, discharging pipe, and two heat exchangers. Each of the heat exchangers is composed of a pair of plates forming a flow path between the plates, wherein at least one of the plates has a shallow bottom pan shape. One of the heat exchangers of the cooler is disposed at one surface side of a semiconductor device while the other one is disposed at a rear surface side of the heater, holding the semiconductor device between the two heat exchangers. The feeding pipe is connected to each of the heat exchangers, allowing the flow path of the feeding pipe to communicate with the heat exchangers. Specifically, one end of the feeding pipe is open and the other end thereof is connected to the heat exchanger located on a second level. The feeding pipe is also connected at a halfway thereof to the heat exchanger located on a first level.

CITATION LIST

Patent Literature

PTL 1: JP 2020-18094 A

SUMMARY OF INVENTION

Technical Problem

In this description a circuit part (inverter circuit) including a power semiconductor element and converting a DC power into an AC power is referred to as a power module, and a module including the power module is referred to as an inverter portion. Thus, the power module in the present description is different from the power module in PTL 1.

The power module in PTL 1 has a flat shape wherein one of its two flat surfaces is referred to as a first surface (lower surface) while the other is referred to as a second surface (upper surface). The "upper" of the "upper surface" and the "lower" of the "lower surface" are simply designated to distinguish between the "upper surface" and the "lower surface". They do not intend to distinguish a vertical direction of the device in an installed position. The first surface and the second surface respectively correspond to the rear surface and the one surface of the semiconductor device of the rotating electric machine unit introduced in Back Background Art.

In the rotating electric machine unit of PTL 1, a refrigerant flowing from a direction perpendicular to the first and second surfaces of the semiconductor device is distributed both to the first and second surfaces of the semiconductor device to cool the semiconductor device. In this configuration, one end of the feeding pipe is open to the upstream side while the other end is connected to the heat exchanger on the second level. This configuration causes a larger amount of refrigerant to flow to the flow path of the heat exchanger on the second level and less amount of refrigerant to flow to the heat exchanger on the first level connected to a halfway of the feeding pipe.

In an inverter integrated motor having a motor to which an inverter portion including a power module is integrated, a smaller sized and highly densified type produces higher heat generation density. Particularly, the inverter portion can have an increased temperature caused by flap heat from the motor. Accordingly, the power module of the inverter integrated motor has to have an increased cooling effect to encounter the flap heat from the motor.

An object of the present invention is to provide an inverter integrated motor that can effectively cool a power module of an inverter portion.

Solution to Problem

In order to achieve the object described above, an inverter integrated motor according to the present invention includes
a motor; and
an inverter portion connected to a motor portion including the motor,
wherein the inverter portion includes:
a power module converting DC power to AC power;
a first flow path forming body provided between the motor and the power module and forming a first flow path;
a second flow path forming body forming a second flow path and disposed at a side opposite a side of the first flow path forming body over the power module,
and wherein the first flow path forming body and the second flow path forming body are configured so that a flow rate of a refrigerant flowing in the first flow path forming body is greater than a flow rate of a refrigerant flowing in the second flow path forming body.

Advantageous Effects of Invention

The present invention can provide an inverter integrated motor that can effectively cool the power module of the inverter portion.

The embodiments described below will clarify problems, configurations and effects other than those described above.

DESCRIPTION OF EMBODIMENTS

Embodiments of the present invention will be described below with reference to the drawings.

Figure 1:
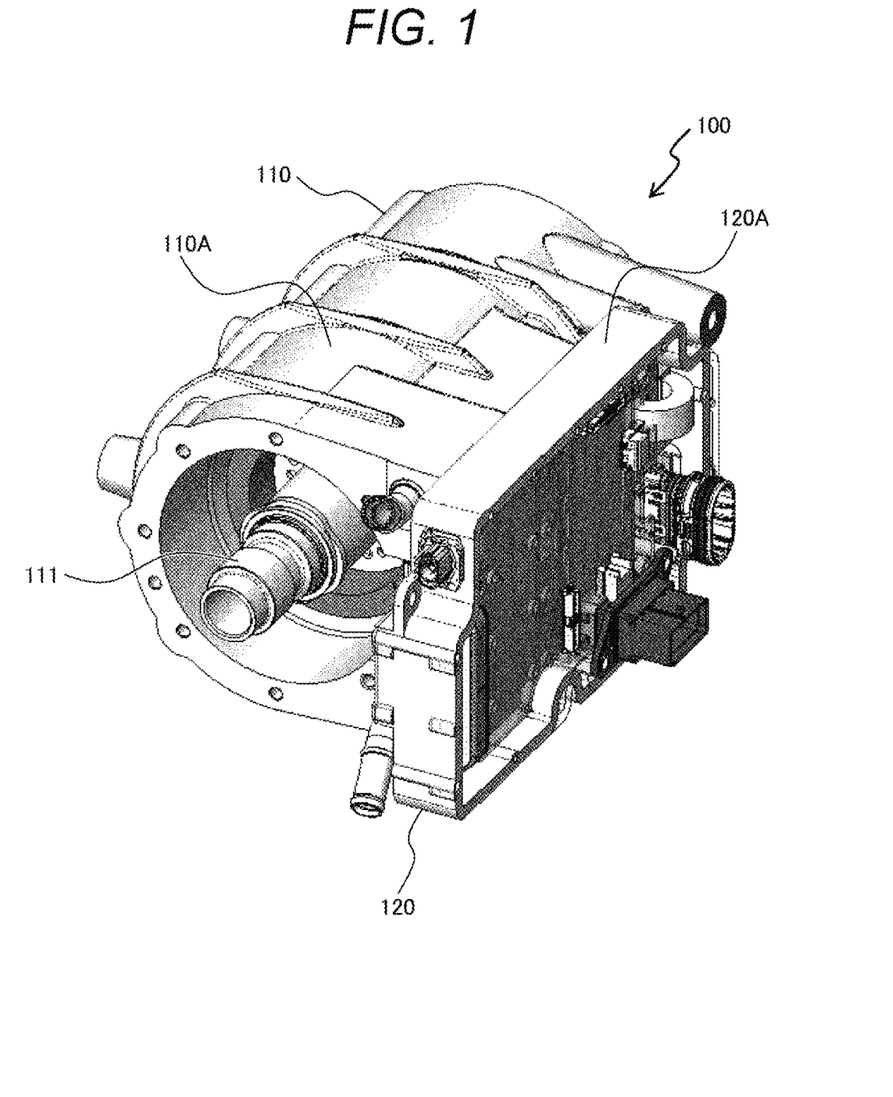
FIG. 1 is a perspective view of an inverter integrated motor according to the present invention.
Figure 2:
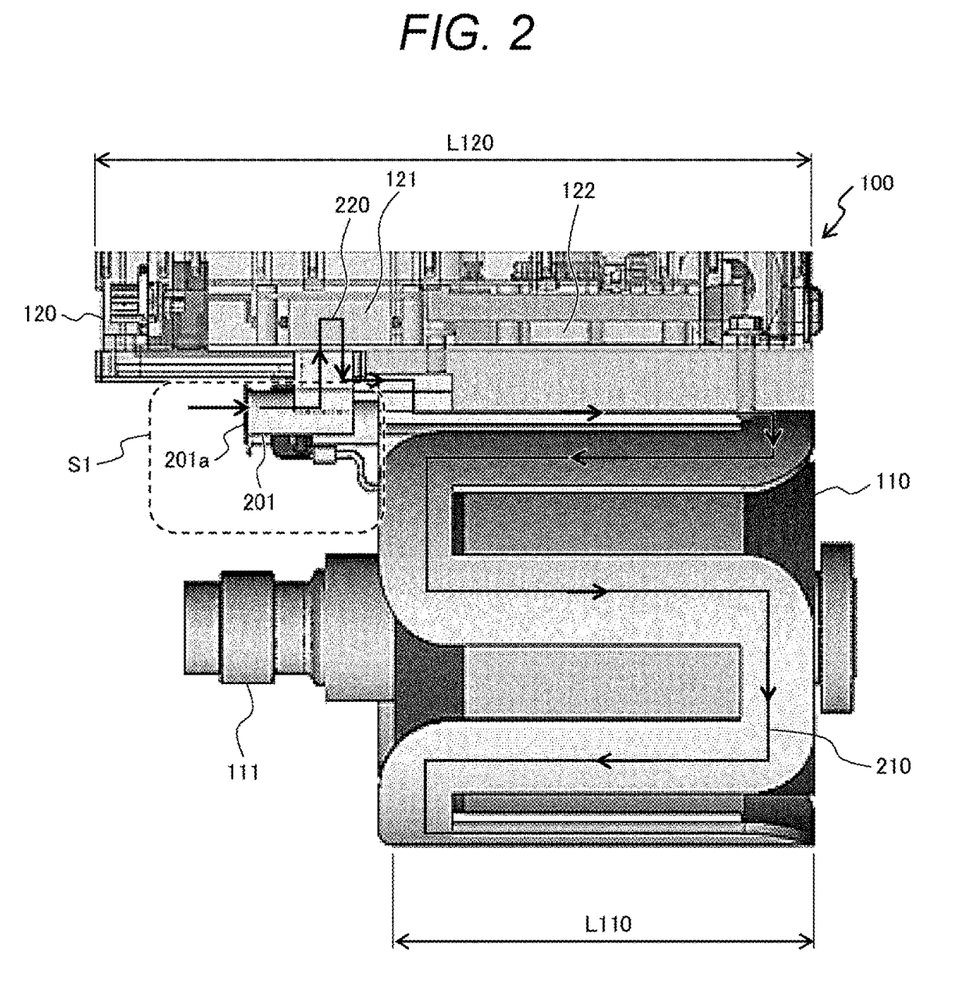
FIG. 2 is a side view of the inverter integrated motor according to the present invention as viewed from a direction perpendicular to the rotating shaft of the motor.

FIG. 1 is a perspective view of an inverter integrated motor according to the present invention. FIG. 2 is a side view of the inverter integrated motor as viewed from a direction perpendicular to the rotating shaft of the motor.

An inverter integrated motor 100 includes a motor 110 and an inverter portion 120 that are integrated into one unit. The motor 110 includes a rotor and stator that are housed inside a tubular housing 110A from which a rotating shaft 111 protrudes outside of the housing 110A. The inverter portion 120 forms a module including such as a power module 121 and capacitor 122. The power module 121 consists of a circuit portion including a power semiconductor element (inverter circuit) and converts a DC power into an AC power.

The housing 110A of the motor 110 and the power module 121 of the inverter portion 120 includes refrigerant flow paths 210, 220 in which a refrigerant flows to cool the motor 110 and the power module 121. The refrigerant flow path 210 is provided in the housing 110A of the motor 110 while the refrigerant flow path 220 is provided in the power module 121, each forming a refrigerant flow path. In the present embodiment, the refrigerant flows from the opening (inflow port) 201a of the inflow port forming body 201 into the refrigerant flow path 220 of the power module 121. It further flows through the refrigerant flow path 220 of the power module 121, and then flows through the refrigerant flow path 210 of the motor housing 110A.

The power module 121 of the inverter portion 120 generates heat by itself and receives flap heat from the motor 110, so that it tends to have an increased temperature. In the inverter integrated motor 100 having a motor 110 to which an inverter portion 120 including a power module 121 is integrated, a smaller sized and highly densified type produces higher heat generation density. Thus, such configuration where the motor 110 and the inverter portion 120 share the refrigerant flow path can cause the flap heat of the motor 110 to transfer to the inverter portion 120, when the motor 110 generates heat. This may result in an insufficient cooling of the inverter portion 120.

In the present embodiment, the inflow port forming body 201 forming the inflow port (opening) 201a of the refrigerant flow paths 210, 220 is provided on the lower side of the inverter portion 120. That is, the inflow port forming body 201 is disposed on the side of the rotating shaft 111 of the motor 110 with respect to the inverter portion 120.

The inverter portion 120 is provided to the motor housing 110A in such a manner that the length L120 thereof along the rotating shaft 111 of the motor 110 is greater than the length L110 of the main body of the motor 110 and protrudes to one end side of the rotating shaft 111 of the motor 110. Therefore, as illustrated in FIG. 2, an empty space S1 is formed between the inverter portion 120 protruding to one end side of the motor 110 and the rotating shaft 111 of the motor 110, allowing the inflow port forming body 201 to be placed in the empty space S1. This arrangement enables downsizing of the inverter integrated motor 100 having the refrigerant flow paths 210, 220.

First Embodiment

A first embodiment of the power module cooling flow path according to the present invention will be described with reference to FIGS. 3 to 5.

Figure 3:
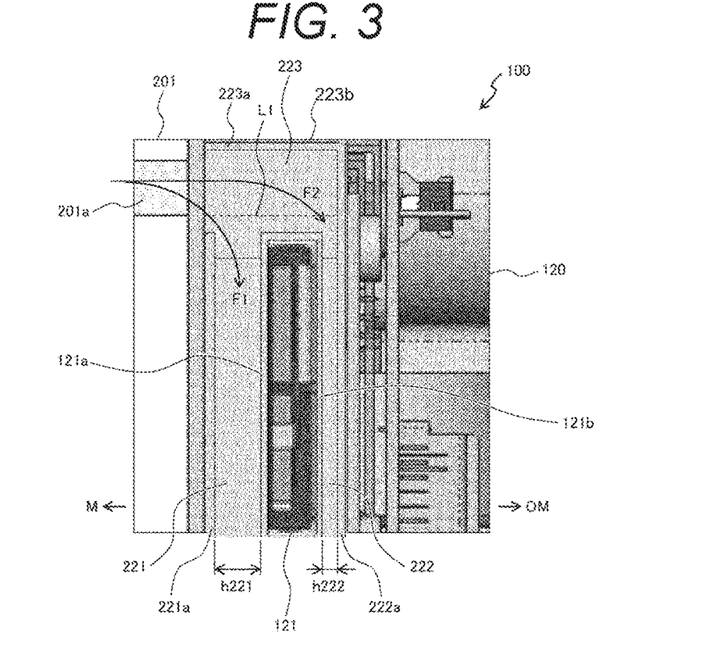
FIG. 3 is an enlarged cross-sectional view of a refrigerant inflow port side of the power module cooling flow path according to a first embodiment of the present invention.

FIG. 3 is an enlarged cross sectional view of a refrigerant inflow port side of the power module cooling flow path according to a first embodiment of the present invention. FIG. 4 is a schematic view of the cross sectional view of FIG. 3. In FIGS. 3 and 4, "M" indicates a motor side, and "OM" indicates a non-motor side.

The power module 121 in PTL 1 has a flat shape wherein one of its two flat surfaces is referred to as a first surface (lower surface) 121a while the other is referred to as a second surface (upper surface) 121b. The "upper" of the "upper surface" and the "lower" of the "lower surface" are simply designated to distinguish between the "upper surface" and the "lower surface". They do not intend to distinguish a vertical direction of the device in an installed position. The first surface 121a is a surface (motor side surface) facing the side M of the motor 110, and is referred to as a rear surface in some cases. The second surface 121b is a surface (non-motor side surface) facing away from the side OM of the motor 110, and is referred to as a front surface in some cases.

The cooling flow path (power module cooling flow path) 220 of the power module 121 includes a first flow path 221, a second flow path 222, and a distribution flow path 223.

The distribution flow path (refrigerant distribution flow path) 223 is a refrigerant supply flow path distributing and supplying the refrigerant to the first flow path (first refrigerant flow path) 221 and the second flow path (second refrigerant flow path) 222. One end (upstream end) of the distribution flow path 223 communicates with the inflow port (refrigerant inflow port) 201a of the inflow port forming body 201. The distribution flow path 223 shown in FIG. 3 is formed by a distribution flow path forming body (refrigerant distribution flow path forming body) 223a and has an outer portion 223b.

The first flow path 221 constitutes a refrigerant flow path through which a refrigerant for cooling the power module 121 flows on the motor side M of the power module 121. The first flow path 221 is formed by a first flow path forming body (first refrigerant flow path forming body) 221a.

The second flow path 222 constitutes a refrigerant flow path through which a refrigerant for cooling the power module 121 flows on the non-motor side OM of the power module 121. The second flow path 222 is formed by a second flow path forming body (second refrigerant flow path forming body) 222a.

As illustrated in FIG. 3, the first flow path forming body 221a and the second flow path forming body 222a together form a single flow path (refrigerant flow path). The power module 121 separates this single flow path into two flow path portions, forming the first flow path 221 and the second flow path 222. In this case, the first surface (lower surface) 121a of the power module 121 constitutes a part of the first flow path forming body 221a while the second surface (upper surface) 121b of the power module 121 constitutes a part of the second flow path forming body 223a.

Thus, the first flow path forming body 221a and the second flow path forming body 222a can be configured as one component, reducing the number of components and assembly man-hours.

Here, another embodiment of the configurations of the first flow path 221 and the second flow path 222 will be described with reference to FIG. 5. FIG. 5 is a perspective view illustrating the configurations of a first and second flow paths of the power module cooling flow path according to the present invention.

Figure 5:
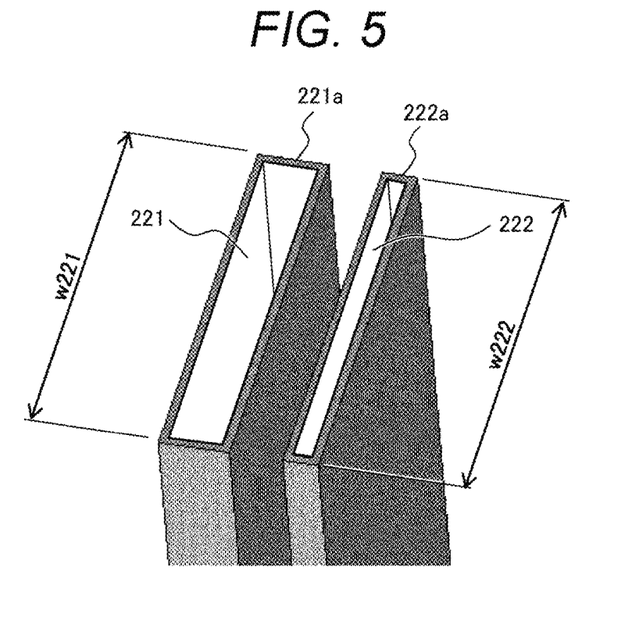
FIG. 5 is a schematic perspective view illustrating the configurations of a first and second flow paths of the power module cooling flow path according to the present invention.

As shown in FIG. 5, the first flow path forming body 221a can be configured as an independent member forming the first flow path 221 while the second flow path forming body 222a can be configured as another independent member forming the second flow path 222. This configuration can enhance the water-tightness of the power module 121.

The first flow path forming body 221a and the second flow path forming body 222a may be configured using a part of a housing (power module housing) that houses the power module 121. In FIG. 3, the portions denoted by reference numerals 221a, 222a, and 223a may together constitute the power module housing. The portion denoted by reference numeral 221a may constitute the first flow path forming body 221a, and the portion denoted by reference numeral 222a may constitute the second flow path forming body 222a. The first surface (lower surface) 121a of the power module 121 may constitute a part of the first flow path forming body 221a while the second surface (upper surface) 121b of the power module 121 may constitute a part of the second flow path forming body 223a.

This can reduce the number of components of and simplify the configurations of the first flow path forming body 221a and the second flow path forming body 222a. In addition, since the first surface 121a and the second surface 121b of the power module 121 form the flow paths of the first flow path 221 and the second flow path 222, respectively, the heat dissipation effect for the refrigerant is improved.

The first flow path 221 and the second flow path 222 can be formed by various configurations in addition to the above-described configurations.

Embodiment will be described further returning to FIGS. 3 and 4.

The distribution flow path 223 distributes the refrigerants F1 and F2 flowing from the direction perpendicular to the first surface 121a and the second surface 121b of the power module 121 to both the refrigerant flow paths 221, 222 of the first flow path 221 on the side of the first surface 121a and the second flow path 222 on the side of the second surface 121b to cool the power module 121. Here, one end (upstream end) of the distribution flow path 223 opens toward the inflow port (refrigerant inflow port) 201a while the other end thereof is connected to the second flow path 222 on the second level. The first flow path 221 of the first level is connected to a halfway of the distribution flow path 223.

This allows an easy flow of refrigerant to the second flow path 222 on the second level while restricting flow of refrigerant into the first flow path 221 on the first level. As a result, an increased amount of refrigerant F2 flows into the second flow path 222 while a reduced amount of refrigerant F1 flows into the first flow path 221. In the present embodiment, as described above, the flap heat from the motor 110 is transferred to the side of the inverter portion 120, so that there might be a possibility that the inverter portion 120 cannot be sufficiently cooled on the motor side M.

Therefore, in the present embodiment, the first flow path 221 is configured to receive a greater flow rate than the second flow path 222. Here, the height direction of the first flow path 221 and the second flow path 222 is designated as a direction perpendicular to the first surface 121a and the second surface 121b of the power module 121. Furthermore, the width direction of the first flow path 221 and the second flow path 222 is designated as a direction perpendicular to the height direction and parallel to the first surface 121a and the second surface 121b.

In order to make the flow rate of the first flow path 221 greater than that of the second flow path 222, the flow path resistance of the first flow path 221 may be set smaller than that of the second flow path 222. Thus, in the present embodiment, the flow path cross section (flow path cross-sectional area) of the first flow path 221 is formed greater than that of the second flow path 222. In FIGS. 3 to 5, the height dimension h221 of the first flow path 221 is larger than the height dimension h222 of the second flow path 222, and the width dimension w221 of the first flow path 221 is equalized to the width dimension w222 of the second flow path 222.

As described above, the inverter integrated motor 100 of the present embodiment is configured as follows.

The inverter integrated motor 100 includes a motor 110 and
    an inverter portion 120 connected to a motor portion including the motor 110, in which the inverter portion 120 includes a power module 121 converting a DC power to an AC power, a first flow path forming body 221a provided between the motor 110 and the power module 121 and forming a first flow path 221, a second flow path forming body 222a forming a second flow path 222 and disposed at a side opposite a side of the first flow path forming body 221a (a side of the motor 110) over the power module 121, and in which the first flow path forming body 221a and the second flow path forming body 222a are configured so that a flow rate of a refrigerant F1 flowing in the first flow path forming body 221a is greater than a flow rate of a refrigerant F2 flowing in the second flow path forming body 222a.

The power module 121 includes a first surface 121a positioned on the side of the first flow path 221 and faces the motor 110 and a second surface 121b provided on a side opposite the side of the motor 110 and on the side of the second flow path 222. The inverter integrated motor further includes a distribution flow path 223 distributing a refrigerant to the first flow path 221 and the second flow path 222. The distribution flow path 223 extends in a direction perpendicular to the first surface 121a and the second surface 121b of the power module 121. One end of the distribution flow path 223 is connected to an inflow port 201a, the other end of the distribution flow path 223 is connected to the second flow path 222, and a halfway of the distribution flow path 223 is connected to the first flow path 221.

Here, the distribution flow path 223 does not have to extend in a direction precisely perpendicular to the first surface 121a and the second surface 121b, and it may be inclined with respect to the vertical direction.

The flow path cross section of the first flow path forming body 221a may be formed to be greater than the flow path cross section of the second flow path forming body 222a.

The first flow path forming body 221a and the second flow path forming body 222a together form a single flow path. The first flow path 221 and the second flow path 222 forming the single flow path may be separated by the power module 121.

In the present embodiment, the inverter portion 120 is connected to the motor portion including the motor 110 for integration. The cooling surfaces (the first surface 121a and the second surface 121b) are provided to the respective two sides of the power module 121. This inhibits influence of flap heat from the motor 110 and restrains uneven cooling of the power module 121.

The flow paths (cooling passage) 221,222 for cooling the power module 121 are disposed to face respective surfaces 121a, 121b of the power module 121, resulting in direct cooling of the power module 121 by the refrigerants F1, F2. This inhibits uneven cooling of the power module 121. Accordingly, this allows the power module 121 to have a smaller area for the transfer of the refrigerant, thereby downsizing the power module 121.

The height dimension h221 of the first flow path 221 facing the motor 110 may set greater than the height dimension h222 of the second flow path 222 located on the side opposite the side of the motor 110 over the power module 121. This configuration can inhibit sudden flow change of the refrigerant in the flow direction of the first flow path 221, thereby inhibiting both increased pressure loss of the refrigerant and reduced flow rate of the refrigerant F1 flowing in the first flow path 221. This can cool the side of the power module 121 facing the motor 110 (first surface 121a) and the side not facing the motor 110 (second surface 121a) in the same degree. Furthermore, the height dimension h221 of the first flow path 221 on the side of the motor 110 is greater than that of the second flow path 222, which can suppress the transfer of the flap heat from the motor 110 to the power module 121.

Second Embodiment

Figure 6:
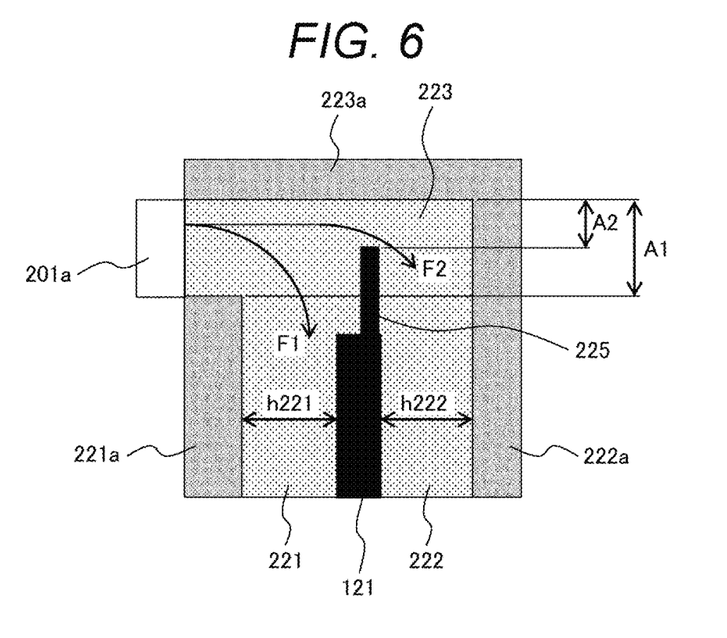
FIG. 6 is an enlarged schematic cross-sectional view of a refrigerant inflow port side of the power module cooling flow path according to a second embodiment of the present invention.

A second embodiment of the power module cooling flow path according to the present invention will be described with reference to FIG. 6. FIG. 6 is an enlarged schematic cross-sectional view of a refrigerant inflow port side of the power module cooling flow path according to a second embodiment of the present invention. For the configurations similar to those in the above-described embodiments, the same reference numerals are denoted and redundant description will be omitted. Configurations different from the above-described embodiments will be described below.

Figure 4:
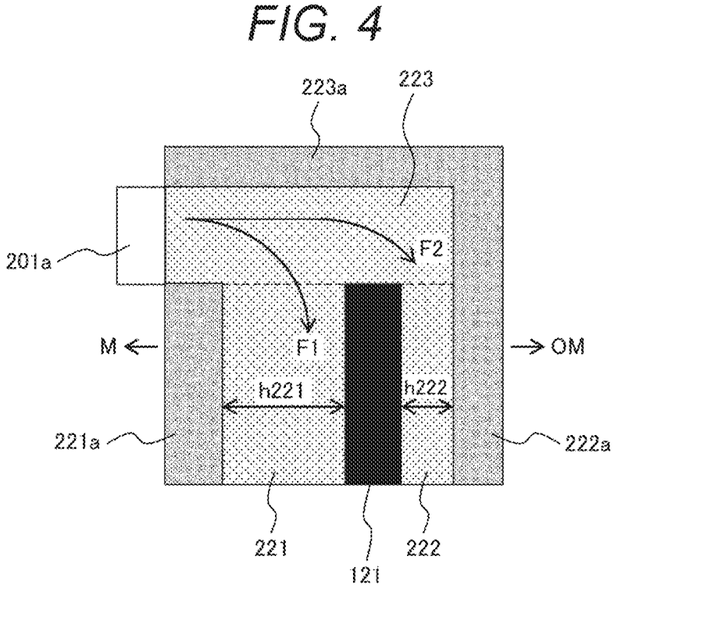
FIG. 4 is a schematic view of the cross-sectional view of FIG. 3.

In the first embodiment shown in FIG. 4, the power module 121 is disposed so that one end thereof is positioned at a boundary of the first flow path 221, the second flow path 222, and the distribution flow path 223. Contrary to the above, the power module 121 of the present embodiment is disposed so that one end thereof protrudes into the distribution flow path 223.

Specifically, in the present embodiment, part (one end) of the power module 121 is disposed so as to overlap the inflow port 201a (flow path cross section of the inflow port 201a), when viewed from a direction perpendicular to the flow path cross section (flow path cross section perpendicular to the flow direction) of the inflow port 201a. This configuration makes the path area A2 of the distribution flow path 223 connected between the inflow port 201a and the second flow path forming body 222a become smaller than the path area A1 of the distribution flow path 223 connected between the inflow port 201a and the first flow path forming body 221a.

Third Embodiment

Figure 7:
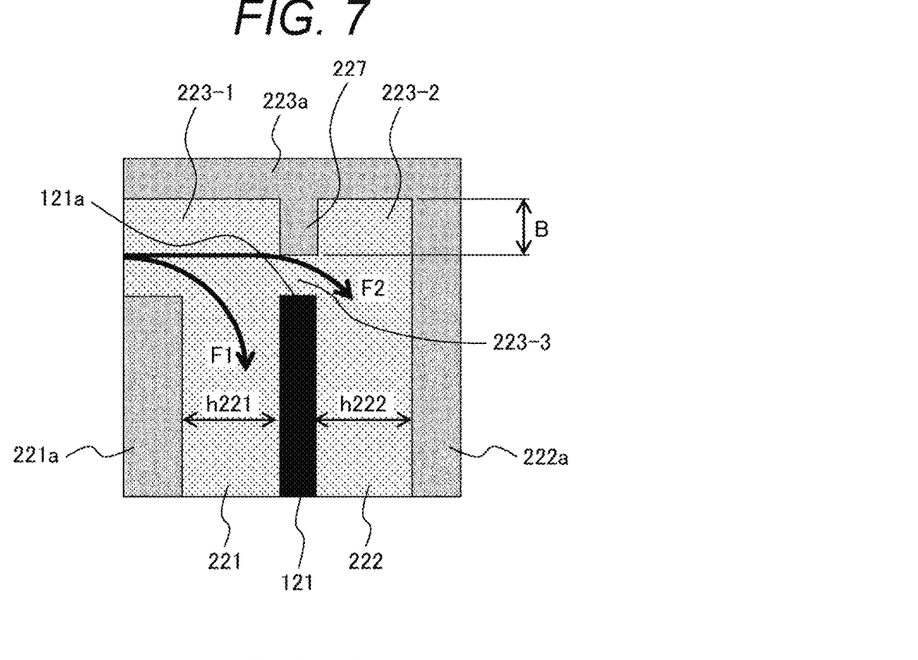
FIG. 7 is an enlarged schematic cross-sectional view of a refrigerant inflow port side of the power module cooling flow path according to a third embodiment of the present invention.

A third embodiment of the power module cooling flow path according to the present invention will be described with reference to FIG. 7. FIG. 7 is an enlarged schematic cross-sectional view of a refrigerant inflow port side of the power module cooling flow path according to a third embodiment of the present invention. For the configurations similar to those in the above-described embodiments, the same reference numerals are denoted and redundant description will be omitted. Configurations different from the above-described embodiments will be described below.

In the present embodiment, a protruding portion 227 is provided to a flow path wall of the distribution flow path 223 so as to protrude into the distribution flow path 223. The protruding portion 227 is provided on the upstream side of the second flow path 222 in the extending direction of the distribution flow path 223, forming a narrowing shape portion that narrows the flow path cross-sectional area of the distribution flow path 223. The narrowing shape portion 227 protrudes from the flow path wall of the distribution flow path 223 toward the one end 121a of the power module 121 so as to face the one end 121a of the power module 121. In FIG. 7, the dimension of the narrowing shape portion 227 protruding inside the distribution flow path is denoted with the reference numeral B.

The narrowing shape portion 227 is provided so as to divide the distribution flow path 223 into a distribution flow path portion 223-1 on the side of the first flow path 221 and a distribution flow path portion 223-2 on the side of the second flow path 222. This configuration provides a connection flow path portion 223-3 that communicates the distribution flow path portion 223-1 with the distribution flow path portion 223-2 between the distribution flow path portion 223-1 and the distribution flow path portion 223-2.

That is, the flow path wall 223a of the distribution flow path 223 in the present embodiment includes the protruding portion 227 provided so as to protrude toward the inside of the distribution flow path 223. The protruding portion 227 is provided on the upstream side of the second flow path 222 in the extending direction of the distribution flow path 223, forming a narrowing shape portion that narrows the flow path cross-sectional area of the distribution flow path 223.

In the present embodiment, the height dimension h221 of the first flow path 221 has the same size (dimension) as the height dimension h222 of the second flow path 222.

In the present embodiment, the narrowing shape portion 227 provides increased pressure loss of the refrigerant F2 flowing to the second flow path 222 while suppressing decrease of flow rate of the refrigerant F1 flowing to the first flow path 221.

In the present embodiment, the narrowing shape portion 227 provided to the flow path wall 223a of the distribution flow path 223 reduces restriction of the position and shape of the end 121a of the power module 121, enhancing the degree of freedom in design for improvement of the cooling performance of the power module 121.

Fourth Embodiment

Figure 8:
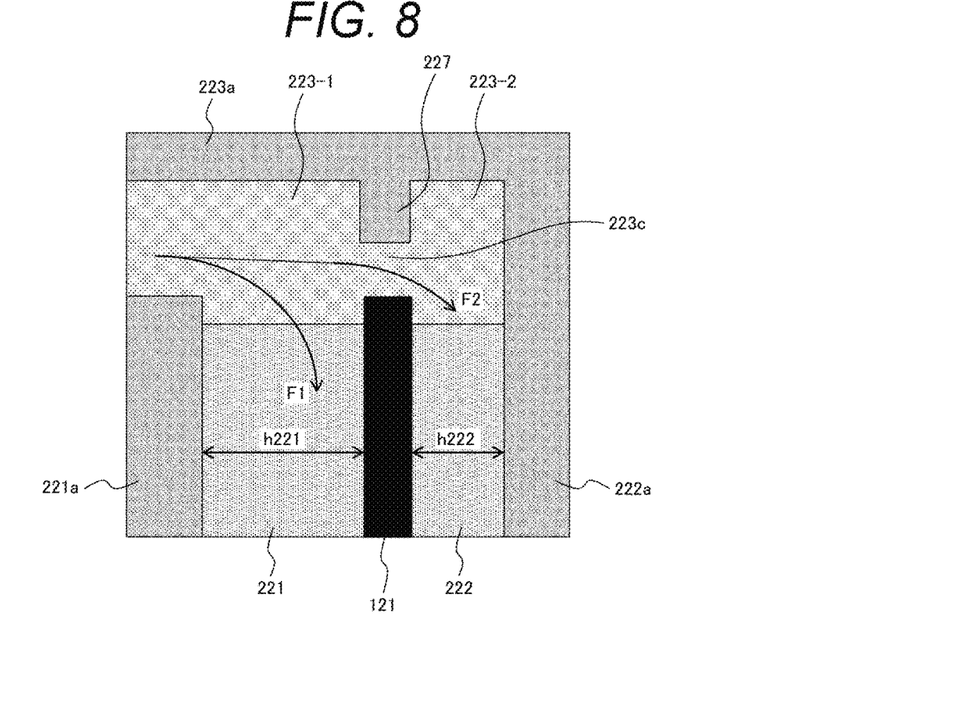
FIG. 8 is an enlarged schematic cross sectional view of a refrigerant inflow port side of the power module cooling flow path according to a fourth embodiment of the present invention.

A fourth embodiment of the power module cooling flow path according to the present invention will be described with reference to FIG. 8. FIG. 8 is an enlarged schematic cross sectional view of a refrigerant inflow port side of the power module cooling flow path according to a fourth embodiment of the present invention. For the configurations similar to those in the above-described embodiments, the same reference numerals are denoted and redundant description will be omitted. Configurations different from the above-described embodiments will be described below.

In the present embodiment, the height dimension h221 of the first flow path 221 is greater than the height dimension h222 of the second flow path 222, whereas in the third embodiment, the size (height dimension) h221 of the first flow path 221 is the same as the height dimension h222 of the second flow path 222. In other words, the third embodiment employs the relation of the height dimensions h221, h222 of the refrigerant flow paths 221, 222 described in the first embodiment.

In this embodiment, the first and second flow path forming bodies 221a, 222a can be formed so that the flow rate of the refrigerant F1 flowing in the first flow path forming body 221a is greater than that of the refrigerant F2 flowing in the second flow path forming body 222a, with or without employing the configurations of the height dimensions h221, h222 provided in the refrigerant flow paths 221,222 in the first embodiment.

Fifth Embodiment

Figure 9:
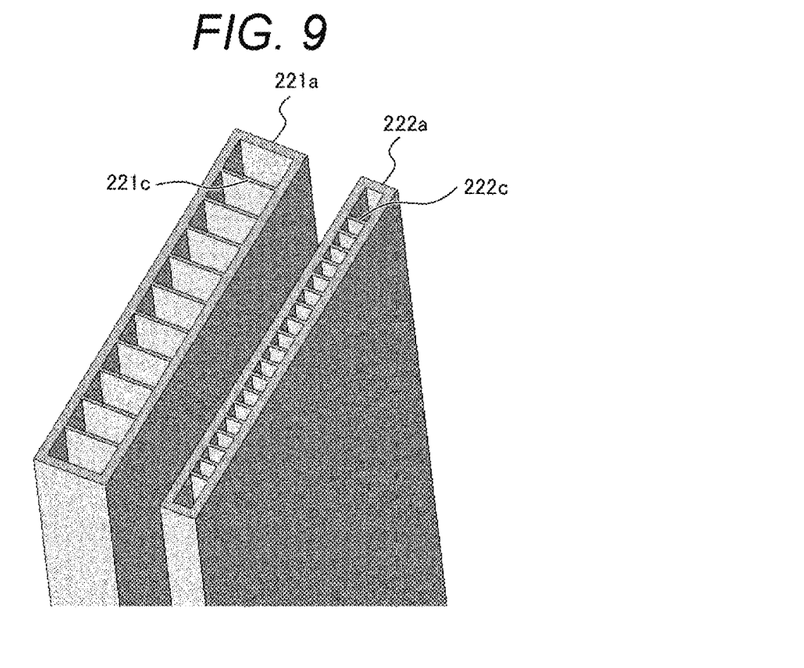
FIG. 9 is an enlarged schematic cross-sectional view of a refrigerant inflow port side of the power module cooling flow path according to a fifth embodiment of the present invention.

A fifth embodiment of the power module cooling flow path according to the present invention will be described with reference to FIG. 9. FIG. 9 is an enlarged schematic cross-sectional view of a refrigerant inflow port side of the power module cooling flow path according to a fifth embodiment of the present invention. For the configurations similar to those in the above-described embodiments, the same reference numerals are denoted and redundant description will be omitted. Configurations different from the above-described embodiments will be described below.

In the present embodiment, the first and second flow path forming bodies 221a, 223a described in the first embodiment with FIG. 5 are provided inside thereof with fins 221c, 222c, respectively. The remaining structures of the present embodiment can be formed similar to those of the first embodiment, while other components can be combined with other embodiments within a range that does not contradict the ideas of other embodiments.

The density in number of the fins 221c of the first flow path forming body 221a is less than that of the fins 222c of the second flow path forming body 223a. This increases the pressure loss of the refrigerant F2 flowing in the second flow path 222, allowing more refrigerant to flow in the first flow path 221. Accordingly, the flow rate of the refrigerant F1 flowing in the first flow path 221 can be increased.

In addition, the fins 221c with lower density in number can reduce transmission of the flap heat from the motor 110 to the power module 121 through the fins 221c.

Sixth Embodiment

Figure 10:
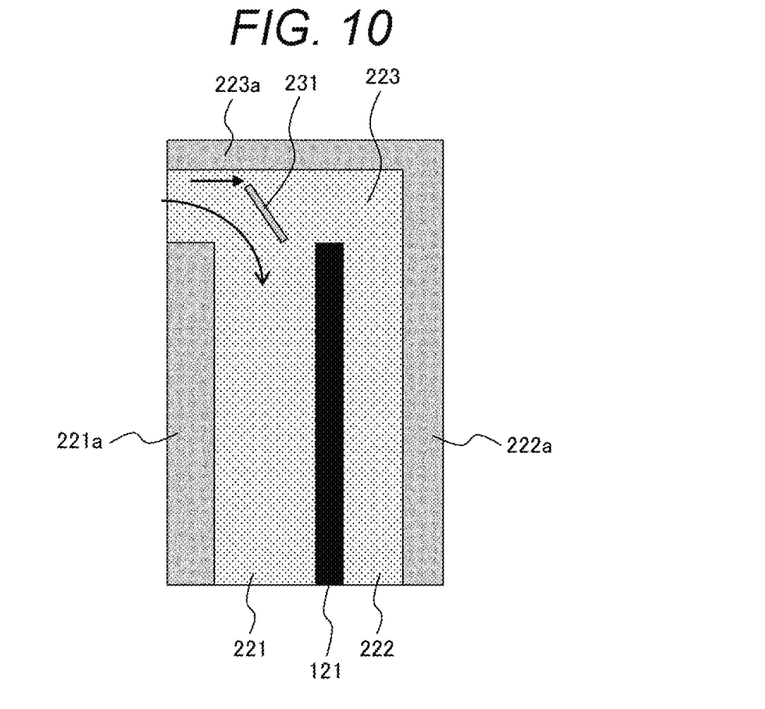
FIG. 10 is an enlarged schematic cross-sectional view of a refrigerant inflow port side of the power module cooling flow path according to a sixth embodiment of the present invention.

A sixth embodiment of the power module cooling flow path according to the present invention will be described with reference to FIG. 10. FIG. 10 is an enlarged schematic cross-sectional view of a refrigerant inflow port side of the power module cooling flow path according to a sixth embodiment of the present invention. For the configurations similar to those in the above-described embodiments, the same reference numerals are denoted and redundant description will be omitted. Configurations different from the above-described embodiments will be described below.

In the present embodiment, a structure 231 is provided that is formed by a part of the flow path wall 223a of the distribution flow path 223 to accelerate the flow to the first flow path 221. This structure may also be referred to as a guide member as it guides the flow to the first flow path 221.

In other words, the inverter integrated motor of the present embodiment includes a partition wall 231 in the distribution flow path 223 to increase the flow rate of the refrigerant to the first flow path 221.

The guide member 231 of the present embodiment can be combined with other embodiments within a range that does not contradict the ideas of the other embodiments.

Seventh Embodiment

Figure 11:
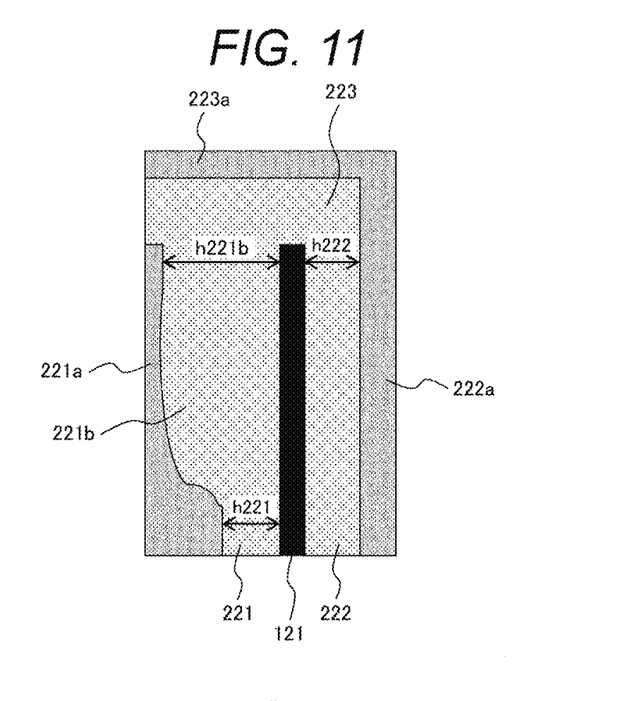
FIG. 11 is an enlarged schematic cross-sectional view of a refrigerant inflow port side of the power module cooling flow path according to a seventh embodiment of the present invention.

A seventh embodiment of the power module cooling flow path according to the present invention will be described with reference to FIG. 11. FIG. 11 is an enlarged schematic cross-sectional view of a refrigerant inflow port side of the power module cooling flow path according to a seventh embodiment of the present invention. For the configurations similar to those in the above-described embodiments, the same reference numerals are denoted and redundant description will be omitted. Configurations different from the above-described embodiments will be described below.

In the present embodiment, the first and second flow path forming bodies 221a, 222a are configured so that the inflow port of the first flow path 221 is greater than that of the second flow path 222. This allows a greater flow rate of the refrigerant to flow in the first flow path 221. Specifically, an entrance 221b of the height dimension h221b of the entrance 221b of the first flow path 221 is made greater than an entrance of the height dimension h222 of the inflow port of the second flow path.

This allows the pressure loss of the refrigerant F1 flowing in the first flow path 221 to be smaller than that of the refrigerant F2 flowing in the second flow path 222, whereby a larger amount of refrigerant can flow in the first flow path 221. Accordingly, the flow rate of the refrigerant F1 flowing in the first flow path 221 can be increased.

The configuration of the entrance 221b of the first flow path 221 of the present embodiment can be combined to other embodiments within a range that does not contradict the ideas of the other embodiments.

Eighth Embodiment

Figure 12:
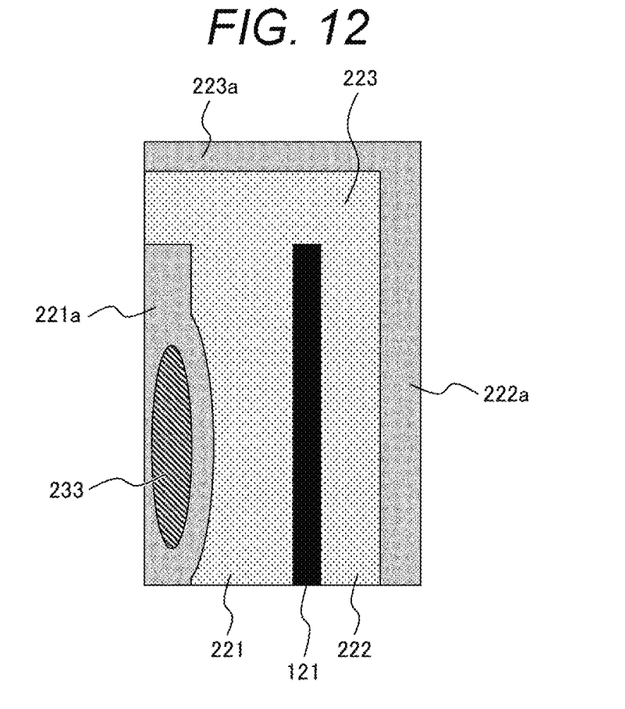
FIG. 12 is an enlarged schematic cross-sectional view of a refrigerant inflow port side of the power module cooling flow path according to an eighth embodiment of the present invention.
Figure 13:
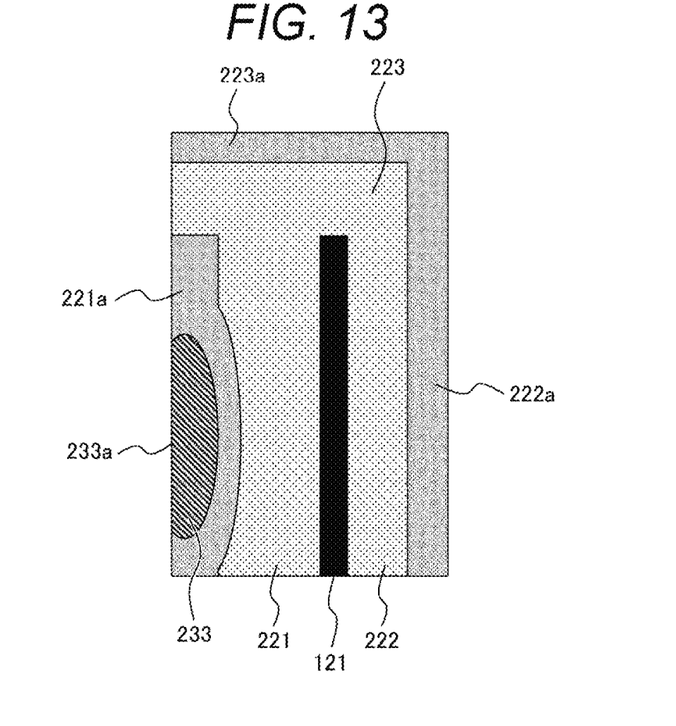
FIG. 13 is an enlarged schematic cross-sectional view of a refrigerant inflow port side of the power module cooling flow path according to the eighth embodiment of the present invention.

An eighth embodiment of the power module cooling flow path according to the present invention will be described with reference to FIGS. 12 and 13. FIG. 12 is an enlarged schematic cross-sectional view of a refrigerant inflow port side of the power module cooling flow path according to an eighth embodiment of the present invention. FIG. 13 is an enlarged schematic cross-sectional view of a refrigerant inflow port side of the power module cooling flow path modified from the eighth embodiment of the present invention. For the configurations similar to those in the above-described embodiments, the same reference numerals are denoted and redundant description will be omitted. Configurations different from the above-described embodiments will be described below.

In the present embodiment, a gap 233 is provided to a part of the first flow path forming body 221a on the side of the motor 110 of the first flow path 221 so as to inhibit transfer of heat (flap heat) from the side of the motor 110. The gap 233 in FIG. 12 does not communicate with an outside whereas the gap 233 in FIG. 13 communicates with the outside through the communication portion 233a.

This can inhibit transfer of heat (flap heat) from the side of the motor 110 to restrain temperature rise of the power module 121.

The gap 233 and the communication portion 233a of the present embodiment can be combined with other embodiments within a range that does not contradict the ideas of the other embodiments.

Ninth Embodiment

Figure 14A:
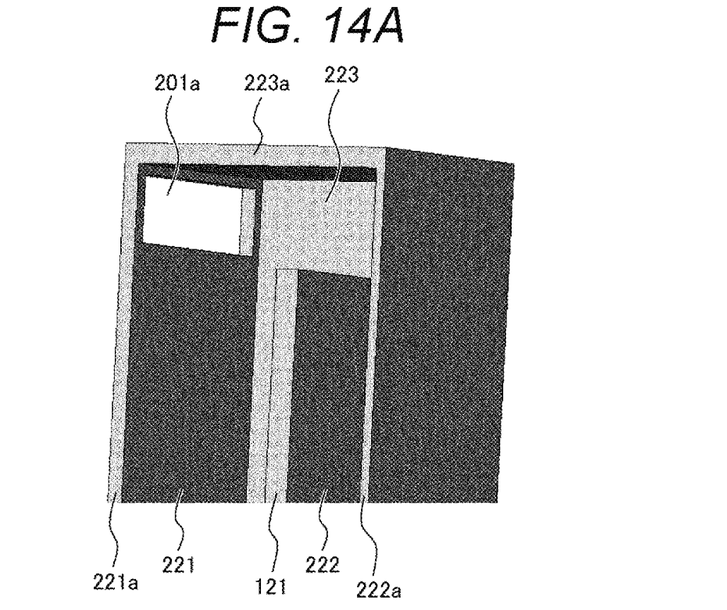
FIG. 14A is an enlarged perspective view of a refrigerant inflow port side of the power module cooling flow path according to a ninth embodiment of the present invention.
Figure 14B:
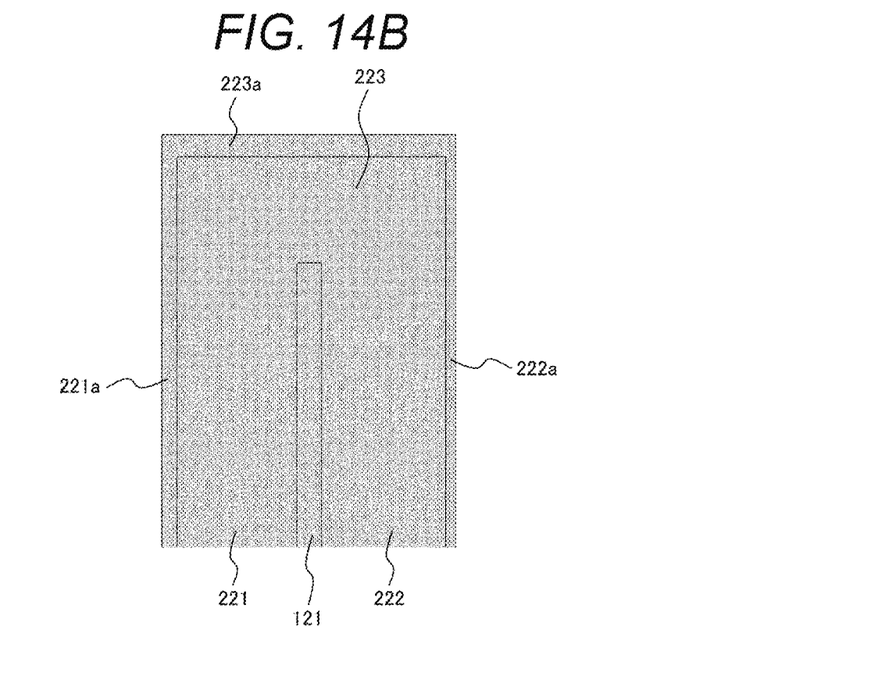
FIG. 14B is an enlarged schematic cross sectional view of a refrigerant inflow port side of the power module cooling flow path according to the ninth embodiment of the present invention.
Figure 14C:
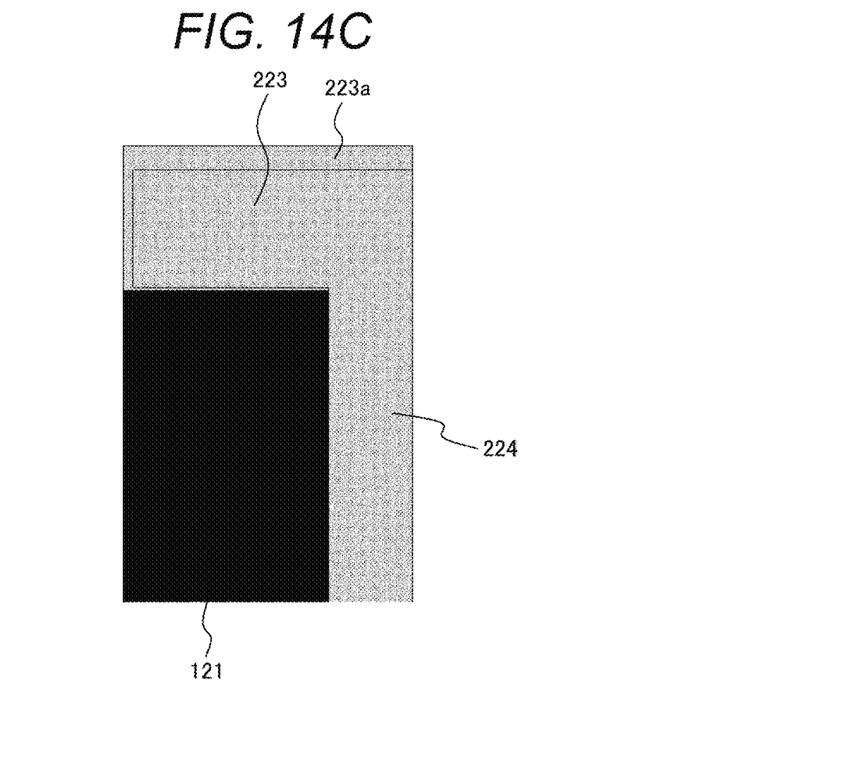
FIG. 14C is an enlarged schematic cross sectional view of a power module cooling flow path as viewed from the refrigerant inflow port side according to the ninth embodiment of the present invention.

A ninth embodiment of the power module cooling flow path according to the present invention will be described with reference to FIGS. 14A to 14C. FIG. 14A is an enlarged perspective view of a refrigerant inflow port side of the power module cooling flow path according to a tenth embodiment of the present invention. FIG. 14B is an enlarged schematic cross-sectional view of the refrigerant inflow port side of the power module cooling flow path according to the tenth embodiment of the present invention. FIG. 14C is an enlarged schematic cross sectional view of the power module cooling flow path as viewed from the refrigerant inflow port side according to the ninth embodiment of the present invention. For the configurations similar to those in the above-described embodiments, the same reference numerals are denoted and redundant description will be omitted. Configurations different from the above-described embodiments will be described below.

In the present embodiment, the first flow path forming body 221a and the second flow path forming body 222a together form a single flow path. The first flow path 221 and the second flow path 222 forming the single flow path may be separated by the power module 121. Furthermore, parts of the first and second flow path 221, 222 together form a communication flow path portion 224 communicating between the flow paths 221,222.

The configurations of the first flow path 221, the second flow path 222 and the communication flow path portion 224 of the present embodiment can be combined to other embodiments within a range that does not contradict the ideas of the other embodiments.

Tenth Embodiment

Figure 15:
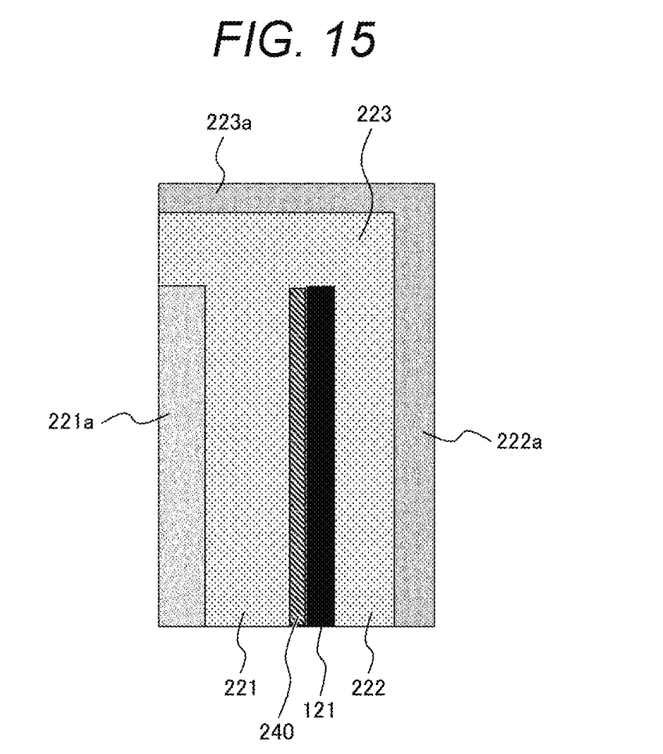
FIG. 15 is an enlarged schematic cross sectional view of a refrigerant inflow port side of the power module cooling flow path according to a tenth embodiment of the present invention.

A tenth embodiment of the power module cooling flow path according to the present invention will be described with reference to FIG. 15. FIG. 15 is an enlarged schematic cross-sectional view of a refrigerant inflow port side of the power module cooling flow path according to the tenth embodiment of the present invention. For the configurations similar to those in the above-described embodiments, the same reference numerals are denoted and redundant description will be omitted. Configurations different from the above-described embodiments will be described below.

In the present embodiment, the side of the first surface 121a of the power module 121 is formed of a substance or member 240 having a higher heat transfer coefficient than the side of the second surface 122a. This allows improved heat transfer from the side of the motor 110 of the power module 121 to the first flow path forming body 221a.

The configuration of the substance or member 240 having high heat transfer efficiency can be combined to other embodiments within a range that does not contradict the ideas of the other embodiments.

Note that the present invention is not limited to the above-described embodiments, and includes various modifications. For example, the above-described embodiments have been described in detail in order to describe the present invention in an easy-to-understand manner, and thus they do not have to have all the configurations. In addition, part of configuration of a certain embodiment can be replaced with a configuration of another embodiment, and a configuration of another embodiment can be added to a configuration of a certain embodiment. Moreover, part of a configuration of each embodiment can be added or replaced with another configuration and it can also be removed.

REFERENCE SIGNS LIST 110 motor
120 inverter portion
121 power module
121a first surface of power module 121
121b second surface of power module 121
201a inflow port
221 first flow path
221a first flow path forming body
221b entrance of first flow path 221
222 second flow path
222a second flow path forming body
223 distribution flow path
223a flow path wall of distribution flow path 223
227 protruding portion (narrowing shape portion)
231 partition wall
233 gap
224 communication flow path portion
240 material or member having high heat transfer coefficient

The invention claimed is:

1. An inverter integrated motor comprising:
a motor; and an inverter portion connected to a motor portion including the motor, wherein the inverter portion includes:
- a power module converting a DC power to an AC power;
- a first flow path forming body provided between the motor and the power module and forming a first flow path;
- a second flow path forming body forming a second flow path and disposed at a side opposite a side of the first flow path forming body over the power module, and
- wherein the first flow path forming body and the second flow path forming body are configured so that a flow rate of a refrigerant flowing in the first flow path forming body is greater than a flow rate of a refrigerant flowing in the second flow path forming body, wherein the power module includes a first surface positioned on a side of the first flow path to face the motor, and a second surface provided on a side opposite a side of the motor and on a side of the second flow path, wherein the inverter integrated motor further includes a distribution flow path distributing a refrigerant to the first flow path and the second flow path, the distribution flow path extending in a direction perpendicular to the first surface and the second surface of the power module, wherein one end of the distribution flow path is connected to an inflow port, the other end of the distribution flow path is connected to the second flow path, and a halfway of the distribution flow path is connected to the first flow path, and wherein viewing from a direction perpendicular to a flow path cross section of the inflow port, part of the power module is disposed to overlap with the inflow port to form a path area of the distribution flow path connecting the inflow port to the second flow path forming body to be smaller than a path area of the distribution flow path connecting the inflow port to the first flow path forming body.

2. The inverter integrated motor according to claim 1, wherein
a flow path cross section of the first flow path forming body is greater than a flow path cross section of the second flow path forming body.

3. The inverter integrated motor according to claim 1, wherein
the first flow path forming body and the second flow path forming body together form a single flow path, and
the first flow path and the second flow path formed as the single flow path are separated by the power module.

4. The inverter integrated motor according to claim 3, wherein
the first flow path and the second flow path are partly communicated to each other, forming a communication flow path portion.

5. The inverter integrated motor according to claim 1, wherein
a flow path wall of the distribution flow path includes a protruding portion on an upstream side of the second flow path so as to protrude toward an inside of the distribution flow path,
the protruding portion being provided on the upstream side of the second flow path in an extending direction of the distribution flow path, the protruding portion forming a narrowing shape portion that narrows a flow path cross-sectional area of the distribution flow path.

6. The inverter integrated motor according to claim 1, wherein
a gap is provided to a part of the first flow path forming body on a side of the motor of the first flow path so as to inhibit heat transfer from the side of the motor.

7. The inverter integrated motor according to claim 1, wherein
a side of the first surface of the power module is formed of a substance having a higher heat transfer coefficient than a side of the second surface.

8. An inverter integrated motor comprising:
a motor; and
an inverter portion connected to a motor portion including the motor, wherein the inverter portion includes:
- a power module converting a DC power to an AC power;
- a first flow path forming body provided between the motor and the power module and forming a first flow path;
- a second flow path forming body forming a second flow path and disposed at a side opposite a side of the first flow path forming body over the power module, and
- wherein the first flow path forming body and the second flow path forming body are configured so that a flow rate of a refrigerant flowing in the first flow path forming body is greater than a flow rate of a refrigerant flowing in the second flow path forming body, wherein the power module includes a first surface positioned on a side of the first flow path to face the motor, and a second surface provided on a side opposite a side of the motor and on a side of the second flow path, wherein the inverter integrated motor further includes a distribution flow path distributing a refrigerant to the first flow path and the second flow path, the distribution flow path extending in a direction perpendicular to the first surface and the second surface of the power module, wherein one end of the distribution flow path is connected to an inflow port, the other end of the distribution flow path is connected to the second flow path, and a halfway of the distribution flow path is connected to the first flow path, and wherein the distribution flow path includes a partition wall that increases the flow rate of the refrigerant to the first flow path.

9. An inverter integrated motor comprising:
a motor; and
an inverter portion connected to a motor portion including the motor, wherein the inverter portion includes:
- a power module converting a DC power to an AC power;
- a first flow path forming body provided between the motor and the power module and forming a first flow path;
- a second flow path forming body forming a second flow path and disposed at a side opposite a side of the first flow path forming body over the power module, and
- wherein the first flow path forming body and the second flow path forming body are configured so that a flow rate of a refrigerant flowing in the first flow path forming body is greater than a flow rate of a refrigerant flowing in the second flow path forming body, wherein the power module includes a first surface positioned on a side of the first flow path to face the motor, and a second surface provided on a side opposite a side of the motor and on a side of the second flow path, wherein the inverter integrated motor further includes a distribution flow path distributing a refrigerant to the first flow path and the second flow path, the distribution flow path extending in a direction perpendicular to the first surface and the second surface of the power module, wherein one end of the distribution flow path is connected to an inflow port, the other end of the distribution flow path is connected to the second flow path, and a halfway of the distribution flow path is connected to the first flow path, and wherein the first flow path forming body and the second flow path forming body are formed so that an entrance of the first flow path is greater than an entrance of the second flow path.

* * * * *